United States Patent Office 3,282,197
Patented Nov. 1, 1966

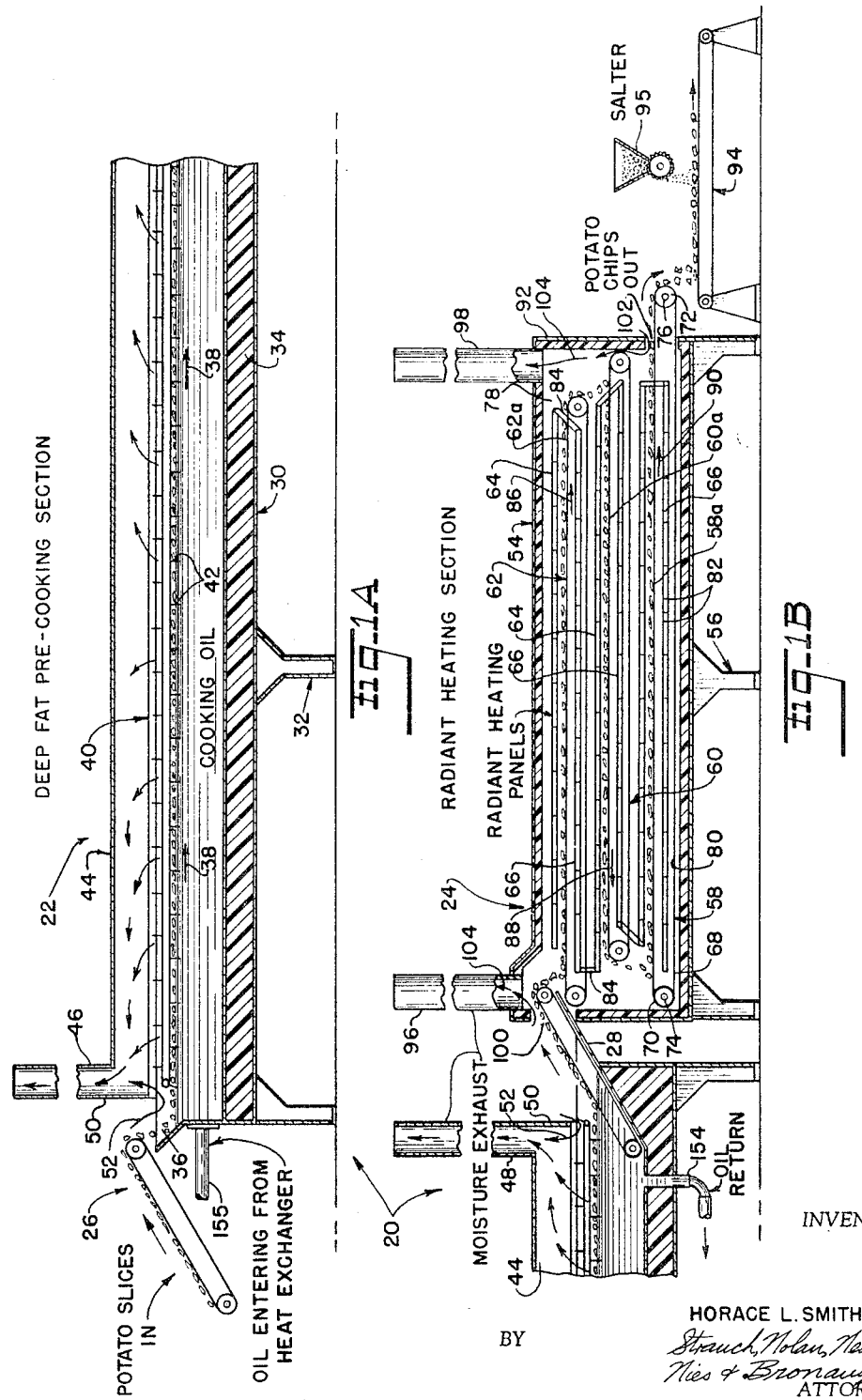

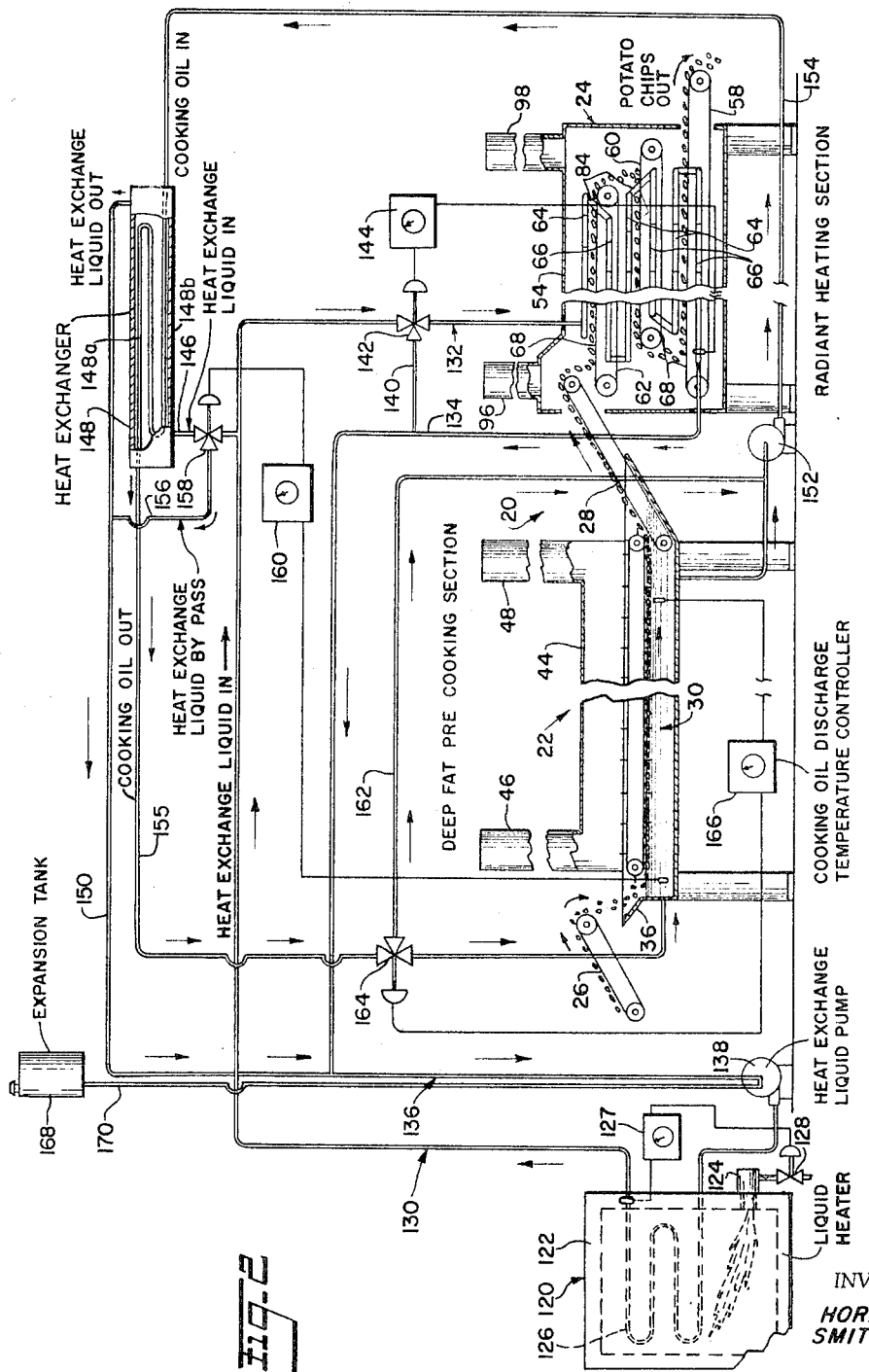

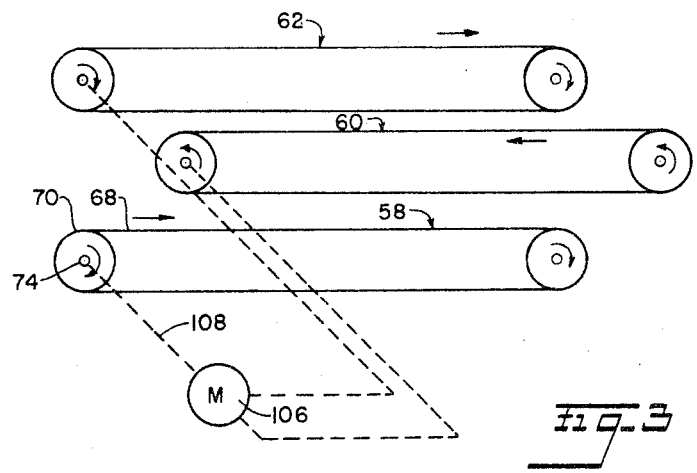
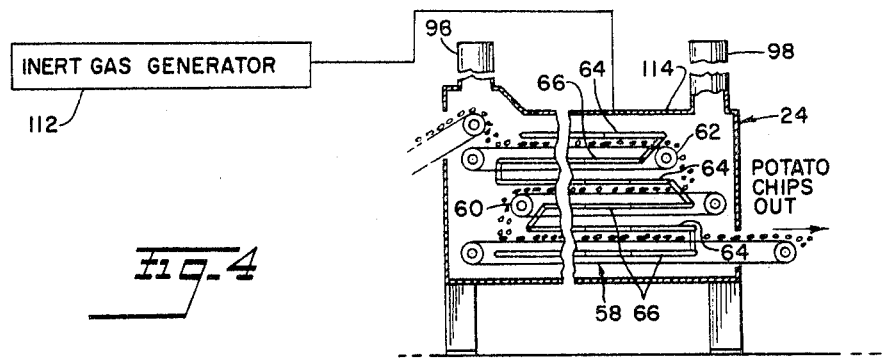

3,282,197
APPARATUS FOR COOKING FOOD
Horace L. Smith, Jr., Richmond, Va., assignor to Hupp Corporation, Cleveland, Ohio, a corporation of Virginia
Original application July 14, 1964, Ser. No. 382,498. Divided and this application Dec. 10, 1965, Ser. No. 512,848
7 Claims. (Cl. 99—405)

This application is a division of application Serial No. 382,498 filed July 14, 1964, by Horace L. Smith, Jr. for Apparatus, Process, and Product.

This invention relates to the cooking or roasting of comestibles; and, more especially, to improved apparatus for cooking or roasting comestibles such as potato chips, and nuts.

The principles of the present invention are particularly applicable to the production of potato chips and will therefore be developed by relating them to this application of the novel concepts disclosed herein. The ensuing description of the present invention, however, is not intended to limit its scope, which is defined solely by the appended claims.

Comestibles of the type to which the present invention relates, such as potato chips, are normally cooked or roasted in hot vegetable or other edible oils which, in the cooking process, evaporate the moisture from the comestible. As the water boils out of the product, it is replaced with the oil in which the product is cooked so that comestibles processed in the manner just described often have an undesirably high fat content.

The foregoing is particularly true in the production of potato chips as raw potato slices are 81–83% water. Moreover, as this water is boiled out of potato slices, a porous, sponge-like structure is formed in which the individual cells or pores are so small that they are completely filled with fat.

The undesirability of this result is evident from the fact that the best quality potato chips are those having the lowest fat content. Thus a top quality potato chip contains not more than 38% fat, a good quality chip about 40% fat, and a poor chip in the range of 42% fat.

Another disadvantage of the above-discussed method of producing potato chips is that, in using this method, it is impossible as a practical matter to accurately control the color of the finished chips so that the chips will range in color from very light to quite dark. This as a serious disadvantage of the conventional process in that a requirement of top quality potato chips is that they be of a uniform and very light color.

I have now discovered that potato chips of improved quality can be produced by novel apparatus in which the raw potato slices are partially cooked in hot oil, but are removed from the oil before all of the water is evaporated from the potato slices and the cooking process completed in a radiant heat cooker. A number of important advantages are obtained by the use of my invention.

First, a potato chip of lower fat content can be produced by my invention than has heretofore been possible. This is because a portion of the water is evaporated from the potato slices while they are in a fat-free environment. Thus, the cells or pores produced by the evaporation of this portion of the water originally contained in the potato slices are not filled with fat. Consequently, less fat is absorbed by the potato slices in my invention than in the conventional process in which the pores produced by the evaporation of water are all filled with fat. Also, the radiant heaters decrease the viscosity of any fat adhering to the partially cooked chips and therefore cause it to drain from the chips, further reducing their fat content.

The second major advantage of my invention is that I am able to produce potato chips which are very light and uniform in color. The color does not develop in the potato slices being cooked until all of the water is evaporated from the slices. As the potato slices are removed from the hot fat before this point in the cooking process is reached in my invention, the color can be developed in the radiant heat cooker in which the application of heat to the chips can be controlled with much greater accuracy than in the conventional hot fat cooker.

Another important advantage of this invention is that it is possible to readily provide an inert or nonoxidizing atmosphere around the chips in both the deep fat and radiant heat cookers. This is important in that, by maintaining the potato slices in an inert atmosphere while they are at elevated temperatures, oxidation and deterioration of the fat contained in the chips can be prevented, eliminating the rancid or off taste which potato chips often have.

A further important advantage of my invention is that, in its preferred embodiment, it consists of apparatus in which a single heating unit may be employed to heat a circulating heat transfer fluid which is utilized to heat both the cooking oil in the deep fat cooker and the radiant heaters in the radiant heat cooker of the apparatus. This arrangement provides both low initial and operating costs and makes substantially cheaper production of potato chips possible.

Yet another important advantage of the novel apparatus I have invented is that it is readily adaptable to the processing of comestibles other than potato chips which are normally cooked or roasted in deep fat such as nuts and the like. In such application of my invention the same important benefits may be obtained as in the processing of potato chips.

The closest prior art of which I am aware is U.S. Patent No. 2,286,644 issued June 16, 1942, to M. Pringle et al. for Method and Apparatus for Processing Potatoes, which discloses a potato chip producing process in which the potato slices are first completely cooked in a hot fluid and then passed between what are termed toasting and post heating grids. There are a number of substantial and important differences between the apparatus and process disclosed in the Pringle patent and the present invention. In Pringle's process the potato slices are dehydrated and cooked to a crisp wafer in the cooking oil. Therefore, Pringle's process is no more capable of producing chips of light and uniform color or of low fat content than a conventional deep fat cooker.

Moreover, there is no suggestion in Pringle of radiantly heating the potato slices in an inert atmosphere or of the important advantages that can be obtained by doing this.

Also, as discussed above, important cost and other advantages are obtained by the preferred embodiment of my invention because a single heating unit is employed to heat the fluid in the deep fat cooker and the radiant heaters in the radiant heat cooker. There is no conception in Pringle of this novel arrangement or the advantages that may be obtained therefrom.

An important object of the present invention resides in the provision of novel and improved apparatus for producing potato chips and other comestibles which are normally processed in deep fat type cooking and roasting apparatus.

In conjunction with the preceding object, another object of this invention is the provision of comestibles processing apparatus, in which:

(1) the comestibles are partially processed in a cooking fluid and then finished in a radiant heat cooker;
(2) fat containing comestibles are cooked in a non-oxidizing atmosphere to prevent oxidation of the fat in which they are cooked and thereby produce a product free of rancid or off taste; and (3) the comestibles are conveyed through a radiant heat cooker in a single thickness layer so that all of the product is uniformly heated.

Other important and specific objects of the present invention are the provision of novel, improved apparatus for processing comestibles such as potato chips and the like:

(1) including a fluid cooker, a radiant heat cooker, and a single heating unit for the cooking fluid and the radiant heaters in the radiant heat cooker; and (2) which is economical to install and to operate.

Additional objects and further novel features of the present invention will become more fully apparent from the appended claims and as the ensuing detailed description and discussion proceeds in conjunction with the accompanying drawing, in which:

FIGURES 1A and 1B together constitute a generally diagrammatic vertical section through comestible processing apparatus for carrying out the methods of and constructed in accordance with the principles of the present invention;

FIGURE 2 is a schematic illustration of a system for heating and circulating the heat transfer medium and for controlling process temperatures in the comestible processing apparatus of FIGURE 1;

FIGURE 3 is a diagrammatic illustration of a system for controlling the speed of the conveyors provided to move the comestibles through the radiant heat cooker of the apparatus of FIGURE 1; and FIGURE 4 is a diagrammatic illustration of a system for establishing an inert atmosphere in the radiant heat cooker.

Referring now to the drawing, FIGURE 1 illustrates potato chip cooking apparatus 20 constructed in accord with the principles of the present invention and including a deep fat cooker 22 and a radiant heat cooker 24. The raw potato slices are fed into deep fat cooker 22 by a conveyor 26 and are partially cooked and dehydrated as they move through the cooker. The partially dehydrated slices are removed from deep fat cooker 22 by conveyor 28 which transfers the slices to radiant heat cooker 24 where the cooking and dehydration is completed (the moisture content of the finished chips is in the range of 0–3%) and the desired color developed in the slices. As the slices are cooked in a fat-free environment in radiant heat cooker 24, the finished chips have a desirably low fat content. Also, as the color of the chips is developed entirely in radiant heat cooker 24, it is possible to accurately control the development of the color and readily produce chips having the uniform light color characteristic of the highest quality potato chips.

Deep fat cooker 22 may advantageously be of the construction disclosed in my previously issued Patent No. 2,812,254 for Method of and Apparatus for Continuously Cooking Potato Chips and Similar Comestibles although it is by no means necessary that this particular cooker be employed in the practice of the present invention. For example, any of a number of commercially available deep fat cookers such as that employed in the Model 15 potato chip machine manufactured and marketed by the J. D. Perry Company, Inc., may be employed if desired.

Since suitable deep fat cookers have previously been described in detail in the patent literature and are commercially available, it is not believed necessary to describe the cooker 22 illustrated in FIGURE 1A in detail. Briefly, however, deep fat cooker 22 comprises an elongated open top tank 30 supported on a framework 32. The side, bottom, and end walls of tank 30 may be lined with insulation 34 to conserve heat.

At its entrance end, tank 30 is provided with a chute 36 which guides the raw potato slices into the body of hot cooking fluid in tank 30 as they fall off the upper end of conveyor 26. As the potato slices drop into the hot cooking fluid, they are moved in the direction indicated by arrows 38 in FIGURE 1A toward the exit end of deep fat cooker 22 at a substantially uniform rate of speed by a rake mechanism 40 having depending fingers 42 which, as they move from left to right in FIGURE 1A, engage and move the cooking slices in the same direction. This rake mechanism is described in detail in my previously issued Patent No. 2,812,254, to which reference may be had if deemed necessary for a more complete understanding of the present invention.

At the exit end of deep fat cooker 22, the partially cooked and dehydrated potato slices are guided by rake mechanism 40 onto conveyor 28 which, as discussed above, transfers the partially cooked slices from deep fat cooker 22 to radiant heat cooker 24. This conveyor and conveyor 26 may be of any desired construction. Since suitable conveyors are commercially available and as their details form no part of the present invention, it is not believed necessary to elaborate upon their construction herein.

The remaining illustrated component of deep fat cooker 22 is a hood 44 which overlies and covers substantially the entire open top of the deep fat cooker's tank 30. Hood 44 collects fumes given off from the hot cooking oil and moisture evolved from the potato slices being cooked in the form of steam. The fumes and steam are carried off by vertical stacks 46 and 48 located at the opposite ends of hood 44. This arrangement of stacks 46 and 48 is a novel and important feature of the present invention in that it operates to materially reduce the oxidation of the cooking fluid, which results in the production of potato chips of higher quality than has heretofore been possible in commercial processes.

Specifically, in deep fat cookers of the type employed in the present invention, the potato chips are processed in vegetable or other edible oils maintained at a temperature commonly in the range of 310–380° F. At such elevated temperatures, the cooking oils deteriorate into compounds which impart a rancid or off taste to the potato chip (see, for example, Factors Affecting the Rate of Deterioration in the Frying Qualities of Fats. I. Exposure to Air. S. P. Rock and H. Roth. J. Am. Oil Chem. Soc. 41: 228–30, 1964). I have now discovered that deterioration of the cooking oil can be prevented by forming a blanket of inert gas over the exposed surface of the cooking oil (by inert gas is meant gas which will not oxidize the cooking oil) and that the unique hood and stack arrangement just described will form the steam evolved from the potato slices being cooked into such a blanket.

In deep fat cookers of the type illustrated in FIGURE 1A, a gap must be left between the hood and the tank or cooking vessel to permit the potato slices to be fed into and removed from the cooker. In the prior art deep fat cookers, which employ a single, centrally located stack, air enters through these gaps, sweeps across the exposed surface of the cooking oil, and passes out the stack so that there is an oxygen bearing atmosphere adjacent the exposed surface of the cooking oil and the latter is subject to rapid deterioration. In my novel, improved hood and stack arrangement, in contrast, the air entering the cooker through the gaps provided for handling the potato chips flows upwardly along the end portions 50 of hood 44 and passes directly out the stack 46 or 48 at the end of the cooker at which it enters, as shown by arrows 52 in FIGURE 1A.

Thus, only a negligible portion, if any, of the surface of the body of cooking oil is contacted by air. The remainder of the surface of this body of fluid is blanketed by steam evaporated from the cooking potato slices which is confined against the exposed surface of the hot oil by hood 44 (because of the relatively high temperatures involved, the evolved moisture in the blanket exists only as dry steam). This blanket of steam excludes oxygen from contact with the cooking fluid, thereby preventing the deterioration resulting from exposure of the cooking oil to oxygen; and, as a result, the rancid or off taste heretofore associated with potato chips is eliminated by processing them in accord with the principles of the present invention.

Referring now to FIGURE 1B, radiant heat cooker 24, into which the partially cooked and partially dehydrated potato slices pass from deep fat cooker 22, consists of an insulated casing 54 supported on a structural framework of any desired configuration, which is identified generally by reference character 56. Housed in casing 54 are three horizontally oriented, vertically spaced apart, endless conveyors 58, 60, and 62. The upper legs 58A, 60A, and 62A of these three conveyors which support the potato slices during their passage through cooker 24, are each disposed between a pair of horizontally oriented radiant heaters 64 and 66. These heaters are preferably of the circulating liquid type and are disposed in parallel, spaced relation to the associated conveyor leg. As shown in FIGURE 1B, the radiant heaters are substantially coextensive in length with the associated conveyor legs; and they preferably span the width of these legs.

Conveyors 58, 60, and 62 may be of any desired construction and, as illustrated, consist of an endless belt 68 trained over rollers 70 and 72 at opposite ends of cooker 24. Rollers 70 and 72 are fixed on shafts 74 and 76 rotatably supported in suitable bearings (not shown) from the side walls 78 (only one of which is shown) of cooker casing 54.

The endless belts 68 may be made of any suitable material such as, for example, stainless steel which is both heat resistant and easy to maintain in a clean and sanitary condition. Belts 68 may be of perforated, mesh, or other open structure so that cooking oil, fragments of potatoes, and other foreign substances can drain or drop through the belts into suitable catch pans below the conveyors. Normally only the top conveyor, on which the potato slices are first received, will require a catch pan as the potato slices will have stopped dripping fat by the time they reach the end of the first conveyor. If a radiant heater is employed beneath the upper leg of the top conveyor, it will preferably be of a construction employing spaced apart tubes or other emitters so that fat and crumbs can pass between the tubes into the catch pan.

Open structure type metal belts are also advantageous in that they transmit most of the radiant energy impinging on them. For this reason, belts of very light construction with a maximum of open area are preferred (some suitable commercially available conveyor belts have well over 90% open area).

Alternatively, conveyor belts 68 may be fabricated of synthetic, open mesh fabrics of the type discussed in my copending application No. 338,382 filed January 17, 1964, for Heat Treating Methods and Apparatus. Such fabrics have mesh openings constituting 30-50% of the area of the fabric and are made of materials which are capable of transmitting various amounts of radiant energy. Such belts will tend to insure an even distribution of radiant energy to both sides of the potato chips being processed in cooker 24 since a substantial portion of the radiant energy emitted by the radiators below the belt will be transmitted through the belt.

Conveyor belts 68 may also be fabricated from synthetic materials, such as Mylar, which retain their structural strength and integrity at elevated temperatures, and which transmit most of the radiant energy impinging upon them. Therefore, this type of conveyor belt also is capable of insuring substantially uniform distribution of radiant energy to both sides of the product being heated.

Each of the radiant heaters 64 and 66 consists of a plurality of radiant heating panels 82 shown diagrammatically in FIGURE 1B. Radiant heating panels 82 may be of any desired type; but are preferably of the circulating liquid type disclosed in my copending application No. 323,848 field November 14, 1963, for Heat Exchanger since a number of important advantages are realized by the use of such heating panels, as disclosed in the copending application.

The several heating panels 82 in each of the radiant heaters 64 and 66 are connected in series flow relationship by appropriate piper connections (not shown) and adjacent radiant heaters 64 and 66 are connected in series by short tubular conduits 84 shown diagrammatically in FIGURE 1B.

As discussed above, the potato slices being processed into potato chips are transferred from deep fat cooker 22 to radiant heat cooker 24 by conveyor 28 in a partially cooked state in which they still have a moisture content on the order of 5-20% so that the cooking can be completed in a fat-free environment to produce a chip of low fat content. This is extremely important in that the chips of the highest quality are those of the lowest fat content. Also, the color is not developed in potato chips until all of the moisture in the potato slices has been evaporated. Therefore, as the potato chips are removed from the deep fat cooker before any color is developed, the color is developed entirely in radiant heat cooker 24. This is also extremely important in that, in radiant heat cooker 24, the speed of conveyors 58, 60, and 62 and the temperature of radiant heaters 64 and 66 can be accurately maintained so that the amount of radiant energy imparted to the chips can be accurately controlled, making it possible to produce finished chips having the very light and uniform color characteristic of the highest quality potato chips.

Referring again to FIGURE 1B, transfer conveyor 28 deposits the partially cooked potato slices removed from deep fat cooker 22 on the upper leg or potato chip supporting surface of conveyor 62, which moves in the direction shown by arrow 86 between a pair of radiant heaters 64 and 66. At the end of the run of conveyor leg 62a, the chips fall onto the upper leg 60a of conveyor 60, which is staggered relative to conveyor 62 to receive the falling chips. The chips are then conveyed between a second pair of radiant heaters 64 and 66 in the opposite direction as shown by arrow 88. At the end of this run, the chips fall onto the upper leg 58a of conveyor 58 and are again conveyed in the reverse direction indicated by arrow 90 between a third pair of radiant heaters 64 and 66. At the end of this run, the finished chips are deposited by conveyor 58, which extends through the right-hand end wall 92 of casing 54, on a diagrammatically illustrated conveyor 94 which transfers the finished chips to appropriate packaging apparatus.

In a typical application of the present invention, 3440 pounds of potato slices having a water content of 82% and a solids content of 18% may be processed per hour to produce 1,000 pounds of potato chips. The moisture content of the slices is reduced to 10% in the deep fat cooker and to 0% in the radiant heat cooker. This application typically employs radiant heaters 36" wide which are capable of emitting 1,250 B.t.u./hr./square foot of radiant surface. If radiant heating units are used above and below the upper leg of each conveyor as is preferred and if three conveyors are employed, each conveyor need be only about six feet long. If radiant heaters are used only above the conveyor legs, the conveyors must be ten feet long to achieve the same production rate for a three deck cooker or 26 feet long for a single deck conveyor.

Salt is conventionally added to potato chips by a salter which consists of a longitudinally grooved roller forming the closure of a hopper bottom. As the potato chips pass beneath the roller, the latter is rotated slowly; and the flutes or grooves in it allow the salt to sprinkle continuously from the hopper onto the chips. Such a salter can readily be used with the potato chip cooking apparatus just described, either at the entrance to or the exit from radiant heat cooker 24 as shown at 95 in FIGURE 1B.

In the processing of potato chips in accord with the principles of the present invention, radiant heaters 64 and 66 are preferably maintained at a temperature in the range of 400–1000° F. and emit radiant energy peaking in the range of 6 to 3.5 microns (the heat output of radiators operated in this temperature range is 1000–8000 B.t.u./square foot/hour). The potato chips, therefore, are heated to relatively high temperatures as they pass through radiant heat cooker 24 as is the cooking fat which adheres to the partially cooked chips removed from deep fat cooker 22. Oxidation of this fat is preferably prevented by maintaining an inert atmosphere in the casing 54 of radiant heat cooker 24. This may be accomplished in substantially the same manner as described above in conjunction with deep fat cooker 22; viz., by employing two vapor removal stacks 96 and 98, one at each end of casing 54, to carry away the water vapor evaporated from the potato slices in cooker 24. Thus, while air will enter casing 54 through the openings 100 and 102 provided to feed potato chips into and remove them from radiant heater 24, this air will move directly upward, as shown by arrows 104 in FIGURE 1B, and will pass out the nearer of the two stacks 96 or 98 with virtually no contact with the potato chips being processed. At the same time, casing 54 will be filled with superheated steam evaporated from the chips in the cooker, which will blanket the chips and prevent the oxidation of any fat adhering thereto.

In the practice of the present invention, each of the two lower conveyors 58 and 60 is preferably operated at a speed slightly faster than the conveyor next above it. The reason for this is that, to develop uniform color in the chips, they must be conveyed through radiant heat cooker 24 in a layer which is a single slice or chip thick. By operating the three conveyors in the manner just described, piling up of the chips as they pass from one conveyor to the next can be prevented, insuring that they move through radiant heat cooker 24 in the desired manner. For the same reason, upper conveyor 62 is preferably operated at a faster speed than the rake mechanism 40 of deep fat cooker 22 and the transfer conveyor 28 between cookers 22 and 24.

An exemplary system for controlling the speed of the three conveyors is illustrated in FIGURE 3. Referring now to this figure, it will be remembered that the endless belt 68 of each of the three conveyors 58, 60, and 62 is trained around a roller 70 mounted on a rotatably supported shaft 74. Therefore, rotation of each shaft 74 causes rotation of the roller 70 it supports which, in turn, effects linear movement of the associated endless belt 68. Shafts 74 are drive connected to an electric motor 106 by a motion-transmitting linkage 108 shown schematically in FIGURE 3. Linkage 108 may be, for example, a belt drive, gear drive, shaft drive, or any other such arrangement. By interposing suitable gears, pulleys, sprockets, or the like in linkage 108, each successive shaft 74 may be made to turn at a slightly higher speed; and the endless belt 68 of each of the three conveyors will therefore move slightly faster. The details of this drive form no part of the present invention; and it is therefore not believed necessary to describe them herein.

The radiant heat cooker 24 just described is exemplary; and a number of modifications may be made in it within the scope of the present invention. For example, a single as opposed to multiple conveyor may be employed although the multiple conveyor arrangement is preferred as it results in a more compact unit and permits variable conveyor speeds to be used to prevent piling of the chips. Also, it is not necessary to use radiant heaters both above and below the upper, potato chip supporting legs of the conveyors. Thus, a single radiant heating unit above each leg may be employed although the double unit is preferred as it provides more uniform and more rapid heating of the potato chips.

Also, an external source of inert gas may be employed, if desired, instead of relying upon evolved moisture to blanket the chips. A system for supplying an inert gas from an external source is illustrated in schematic form in FIGURE 4. Referring now to this figure, the inert gas source may be a bottle or other container or any of a number of commercially available inert gas generators such as those manufactured by the Kemp Company of Baltimore, Maryland, or the Thermal Engineering Corporation of Conshohocken, Pennsylvania, as illustrated at 112. The generator discharges the gas under sufficient pressure to cause it to flow to radiant heat cooker 24. The gas is preferably introduced into the cooker through the top will 14 of casing 54 at the midpoint of cooker 24 as shown in FIGURE 2.

Or, if desired, the combustion products of the heating unit employed to heat the circulating heat transfer liquid may be employed to blanket the chips. A supplementary burner or a catalytic purification device is preferably provided to rid the combustion product of any unconsumed oxygen if this type of inert gas supply is utilized.

Alternatively, in some circumstances, the problem of oxidation of fat may not be present, in which case the provision of a nonoxidizing atmosphere in radiant heat cooker 24 may be dispensed with entirely.

Also, it is not absolutely essential that circulating liquid type radiant heaters operating in the range of 400–1000° F. be employed. For example, the "Jetube" type radiant heater disclosed in my copending application Serial No. 343,243 filed February 7, 1964, for Heating Apparatus and Method may be employed in the practice of the present invention as may quartz lamp radiant heating units as disclosed in my copending application No. 262,569 filed March 4, 1963 for Drying Apparatus and Method (now Patent No. 3,237,314). Another type of radiant heating unit which may be employed in the practice of the present invention is that disclosed in my copending application No. 323,840 filed November 14, 1963 for System, Apparatus, and Process (now Patent No. 3,258,204), which discloses radiant heating units of the circulating liquid type particularly adapted to employ eutectic mixtures of inorganic salts as the circulating heat transfer medium. Also, various types of commercially available radiant heating units can be employed in place of the preferred form of radiant heater.

Many of these alternate forms of radiant heaters, while they would be operable, would not be practical for a commercial process for economic reasons. The illustrated form of radiant heater, which can be economically manufactured and operated, is therefore preferred, although the alternate forms of radiant heaters may have limited application in special circumstances.

The principles of the present invention are readily adaptable to existing potato chip cooking installations which may be made to operate in accord with the principles of the present invention by the addition of a radiant heat cooker as disclosed herein. In these circumstances, it is, in most cases, most economical to add to the existing installation a separate unit for heating the heat transfer liquid circulated through radiant heaters 64 and 66. The preferred heat transfer liquids are "Smitherm A" and "Smitherm B" (which are chlorinated biphenyls) and "Smitherm D" (a phenyl triaryloxy silane). All of these liquids are available from the Smitherm Division of Hupp Corporation. These materials are liquid at elevated temperatures and are circulated in liquid form at substantially atmospheric pressure. Depending upon the particular one of these materials selected, it may be circulated at temperatures up to 700° F. without exceeding a permissible rate of decomposition. A suitable system for heating and circulating liquids of this type, which may advantageously be employed in the modification of existing systems, is disclosed in my copending application Serial No. 237,817 filed November 15, 1962, for High Temperature Heating Apparatus (now Patent No. 3,236,292).

It is one of the novel and important features of the present invention, however, that the cooking fluid in deep fat cooker 22 and the radiant heaters 64 and 66 in radiant heat cooker 24 can be maintained at the desired temperatures by a single heating unit. Although this aspect of the present invention is probably of most importance in the application of the present invention to new installations, it can also be applied to the modification of existing installations, if desired. An exemplary system for heating the circulating transfer liquid is illustrated in FIGURE 2, to which reference is now made.

My novel heating system includes a single heating unit 120 of any desired construction. As illustrated, this heating unit includes an insulated casing 122, a burner 124 firing into the casing, and coils 126 in the casing, through which the heat transfer liquid passes. A controller 127, responsive to the temperature of the circulating medium as it leaves heating unit 120, controls the flow of fuel to burner 124 through a valve 128.

From heating unit 120, the heat transfer liquid flows through main supply conduit 130 and branch supply conduit 132 to the radiant heating units 64 and 66 in radiant heat cooker 24 which, as discussed above, are so connected that the heat transfer medium flows in series through the several heating units. From radiant heat cooker 24, the heat transfer medium is pumped through branch and main return conduits 134 and 136 back to heating unit 120.

To provide an accurate control of the temperature of radiant heating units 64 and 66, a bypass conduit 140 is connected between the branch supply and return conduits 132 and 134 connected to radiant heat cooker 24. If the temperatures of the radiant heating units rise above the desired temperature, the hot circulating medium flowing from heating unit 120 is diverted through bypass 140 by a three-way valve 142 operated by a controller 144, which is responsive to the temperature of the circulating medium as it exits from the radiant heat cooker 24. Valve 142 has an inlet connected to branch supply conduit 132 and outlets connected to bypass conduit 140 and to branch return conduit 134.

Main supply conduit 130 is also connected, through a branch supply conduit 146, to a heat exchanger 148 of any desired construction having two independent circuits through which fluids can flow in physically isolated, heat transfer relationship. For example, the cooking fluid may flow through diagrammatically illustrated heating coil 148a and the circulating heat transfer fluid through heat exchanger casing 148b around the heating coil. From heat exchanger 148, the circulating heat transfer medium flows through a branch return conduit 150 into main return conduit 136 through which the circulating medium is pumped by pump 138 back into heating unit 120.

The heated cooking fluid in deep fat cooker 22 is circulated by pump 152 through conduit 154 to heat exchanger 148 through which it flows in physically isolated, heat transfer relationship to the circulating heat transfer medium, which gives up its heat to the cooking fluid. From heat exchanger 148, the heated cooking fluid flows through conduit 155 back into the tank 30 of the deep fat cooker. The details of this method of heating the cooking fluid in deep fat cooker 22 and its advantages are discussed in detail in my prior Patent No. 2,812,254 to which reference may be had, if desired.

The temperature of the cooking fluid is controlled by regulating the temperature of the fluid as it is discharged into tank 30 from conduit 155 (the entrance temperature) and as it is discharged from tank 30 into conduit 154 (the exit temperature). In order to accurately control the entrance temperature of the cooking fluid in deep fat cooker 22, provision is made for bypassing the circulating heat transfer medium around heat exchanger 148. Specifically, a bypass conduit 156 is connected between the branch supply conduit 146 to heat exchanger 148 and the branch return conduit 150 connecting the heat exchanger to heating unit 120. Heated circulating heat transfer medium flowing from heating unit 120 to heat exchanger 148 may be diverted through bypass conduit 156 by adjusting three-way valve 158 which is operated by a controller 160 responsive to the temperature of the cooking oil at the point at which heated cooking oil is discharged into tank 30.

Assuming, for example, that the temperature of the cooking fluid at this point in tank 30 is above the desired temperature, controller 160 will operate valve 158 to divert a portion of the flow of the circulating heat transfer medium around heat exchanger 148. Therefore, the cooking fluid will pick up less heat from the heat exchanger and will be relatively cooler when it is returned to tank 30, which will reduce the entrance temperature in the tank.

The exit temperature of the cooking fluid in tank 30 is controlled by diverting the cooking fluid around tank 30 through a bypass conduit 162 connected between the two conduits 154 and 155 through which the cooking fluid circulates between tank 30 and heat exchanger 148. Flow through bypass conduit 162 is controlled by a three-way valve 164 operated by a controller 166 responsive to the temperature of the cooking fluid adjacent the point at which it is discharged from tank 30 into conduit 154. Therefore, if the temperature at this point exceeds the predetermined value, controller 166 will operate three-way valve 164 to divert part or all of the heated cooking fluid flowing in conduit 155 through bypass conduit 162 to conduit 154. This reduces the volume of fluid flowing through deep fat cooker 22 and, consequently, the exit temperature of the fluid.

In addition to the foregoing components, the fluid heating and circulating system just described includes an expansion tank 168 connected to the inlet of pump 138 by branch conduit 170. Expansion tank 168 accommodates expansion of liquid in the closed system, preventing abnormal pressure conditions from bursting conduits or other system components, and also maintains a gravity head on the system.

The components employed in the system described above are not critical and may be of any commercially available type. For example, appropriate three-way valves and suitable controllers are manufactured by the Minneapolis-Honeywell Regulator Co.

From the foregoing, it will be apparent that this invention is also applicable to the production of other comestibles which are processed by cooking them in hot oil. For example, nuts are conventionally roasted in this manner. The fat content of roasted nuts can be reduced and their quality thereby upgraded by partially roasting the nuts in hot oil and then completing the roasting process by radiant heat in accord with the principles of the present invention. Or in this exemplary and other applications of my invention, it may be advantageous to dispense with deep fat cooking altogether and use radiant heat for the entire process. Such applications of the concepts disclosed herein are intended to be covered by the appended claims except as specifically excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for producing potato chips, roasted nuts, and like products, comprising:
    a. first cooking means adapted to contain a cooking fluid through which the raw comestibles may be moved to at least partially cook said comestibles and reduce the moisture content thereof;
    b. second radiant heat cooking means separate from said first cooking means for removing at least most of the remainder of the water from the comestibles, said radiant heat cooking means comprising at least one radiator of the circulating liquid type;

c. heating means including a single heating unit for maintaining both the temperature of the cooking fluid and the temperature of said radiator at the desired levels; and d. means for independently regulating the temperature level of the cooking fluid and the temperature level of said radiator.

2. Apparatus for producing potato chips, roasted nuts, and like products, comprising:

a. first cooking means at least partially cooking said comestibles and reducing the moisture content thereof, said first cooking means including means adapted to contain a cooking fluid and means for moving the comestibles through the fluid at a predetermined rate of speed; and b. second radiant heat cooking means for removing at least most of the remainder of the water from the comestibles, said radiant heat cooking means comprising a plurality of horizontally oriented, vertically spaced apart, radiantly heated conveyors and means for operating each conveyor in the opposite direction from and at a higher linear speed than the next higher of said conveyors and for operating the initial one of said conveyors at a higher linear speed than the means provided for moving the comestibles through the cooking fluid in the first cooking means to prevent piling up of the comestibles on said conveyors and thereby insure uniform heating of said comestibles as the comestibles pass through said radiant heat cooking means.

3. Apparatus according to claim 2, wherein there are radiant heater panels on both sides of at least one of said conveyors.

4. Apparatus for producing potato chips, roasted nuts, and like products, comprising:

a. first cooking means adapted to contain a cooking fluid through which the raw comestibles may be moved to at least partially cook said comestibles and reduce the moisture content thereof, said first cooking means including a heat exchanger adapted to have a heat transfer fluid circulated therethrough;

b. second radiant heat cooking means separate from said first cooking means for removing at least most of the remainder of the water from the comestibles, said radiant heat cooking means comprising at least one radiator of the circulating liquid type; and c. heating means including a single heating unit for maintaining both the temperature of the cooking fluid and the temperature of said radiator at the desired levels, said heating means further comprising conduit means connecting said heating unit to the heat exchanger of said first cooking means and to the radiator in the radiant heat cooking means.

5. Apparatus for producing potato chips, roasted nuts, and like products, comprising:

a. first cooking means adapted to contain a cooking fluid through which the raw comestibles may be moved to at least partially cook said comestibles and reduce the moisture content thereof;

b. second radiant heat cooking means separate from said first cooking means for removing at least most of the remainder of the water from the comestibles, said radiant heat cooking means comprising at least one radiator of the circulating liquid type; and c. heating means including a single heating unit for maintaining both the temperature of the cooking fluid and the temperature of said radiator at the desired levels, first supply and return means connecting said radiator in fluid communication with said heating unit, a heat exchanger adapted to have two fluids circulated therethrough in physically isolated relationship, second supply and return means connecting said heat exchanger in fluid communication with said heating unit, and means for circulating said cooking fluid from said first cooking means through said heat exchanger and back to said first cooking means.

6. Apparatus according to claim 5, together with means for maintaining the temperature of the cooking fluid and the temperature of the radiant cooking means at the desired levels, including:

a. means responsive to the temperature of the cooking fluid at the entrance end of the first cooking means for controlling the circulation of the heat transfer liquid through said heat exchanger;

b. means responsive to the temperature of the cooking fluid at the exit end of the first cooking means for controlling the circulation of the cooking fluid through said heat exchanger; and c. radiator temperature responsive means for controlling the circulation of the heat transfer liquid through the radiant heat cooking means.

7. Apparatus for producing potato chips, roasted nuts, and like products, comprising:

a. first cooking means adapted to contain a cooking fluid through which the raw comestibles may be moved to at least partially cook said comestibles and reduce the moisture content thereof;

b. second radiant heat cooking means separate from said first cooking means for removing at least most of the remainder of the water from the comestibles, said radiant heat cooking means comprising at least one radiator of the circulating liquid type, a casing surrounding the radiator, and vapor removal stacks communicating with the interior of said casing at the entrance and exit ends thereof; and c. heating means including a single heating unit for maintaining both the temperature of the cooking fluid and the temperature of said radiator at the desired levels.

References Cited by the Examiner

UNITED STATES PATENTS

| | | | |
|---|---|---|---|
| 1,579,994 | 4/1926 | Atkinson et al. | 34—205 |
| 2,286,644 | 6/1942 | Pringle et al. | 99—100 |
| 2,496,548 | 2/1950 | La Rosa et al. | 198—84 X |
| 2,767,095 | 10/1956 | Smith | 99—100 |
| 2,812,254 | 11/1957 | Smith | 99—100 |

FOREIGN PATENTS

| | | |
|---|---|---|
| 963,046 | 12/1949 | France. |
| 393,659 | 6/1933 | Great Britain. |
| 608,421 | 9/1948 | Great Britain. |
| 639,895 | 7/1950 | Great Britain. |
| 821,027 | 9/1959 | Great Britain. |

BILLY J. WILHITE, *Primary Examiner.*

UNITED STATES PATENT OFFICE
CERTIFICATE OF CORRECTION

Patent No. 3,282,197                                  November 1, 1966

Horace L. Smith, Jr.

It is hereby certified that error appears in the above numbered patent requiring correction and that the said Letters Patent should read as corrected below.

Column 1, line 47, for "as" read -- is --; column 8, line 10, for "will" read -- wall --; same line 10, for "14" read -- 114 --; column 11, line 50, after "heating" strike out the comma.

Signed and sealed this 5th day of September 1967.

(SEAL)
Attest:

ERNEST W. SWIDER
Attesting Officer

EDWARD J. BRENNER
Commissioner of Patents